United States Patent
Brown et al.

(10) Patent No.: US 12,437,883 B1
(45) Date of Patent: Oct. 7, 2025

(54) DIODE ASSEMBLY FOR PULSED FUSION EVENTS

(71) Applicant: Consolidated Nuclear Security, LLC, Oak Ridge, TN (US)

(72) Inventors: Sam W. Brown, Jensen Beach, FL (US); Michael R. Phillips, Harriman, TN (US); William T. Rogerson, Jr., Knoxville, TN (US); Blake F. Scott, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 734 days.

(21) Appl. No.: 16/366,178

(22) Filed: Mar. 27, 2019

(51) Int. Cl.
   *G21B 1/19* (2006.01)
   *G21B 1/03* (2006.01)
   *H05H 1/06* (2006.01)

(52) U.S. Cl.
   CPC .......... *G21B 1/19* (2013.01); *G21B 1/03* (2013.01); *H05H 1/06* (2013.01)

(58) Field of Classification Search
   CPC ... G21B 1/02; G21B 1/05; G21B 1/11; G21B 1/19
   USPC ................... 376/141, 151, 152, 121
   See application file for complete search history.

(56) References Cited

U.S. PATENT DOCUMENTS

| | | | |
|---|---|---|---|
| 4,277,305 A * | 7/1981 | Bohachevsky | H05H 1/08 376/103 |
| 4,376,752 A * | 3/1983 | Nuckolls | G21B 1/19 376/152 |
| 4,608,222 A * | 8/1986 | Brueckner | G21B 1/23 376/104 |
| 7,634,042 B2 | 12/2009 | Auchterlonie | |
| 8,493,548 B2 | 7/2013 | Ivanov et al. | |
| 9,036,765 B2 | 5/2015 | Birnbach | |
| 9,082,516 B2 | 7/2015 | Slough | |
| 9,524,802 B2 | 12/2016 | Slough | |
| 2007/0064857 A1* | 3/2007 | Winterberg | G21B 1/01 376/107 |
| 2010/0219385 A1* | 9/2010 | Miller | G21B 1/19 252/636 |
| 2011/0019789 A1* | 1/2011 | Wessel | G21B 1/03 376/108 |

OTHER PUBLICATIONS

Wessel et al., "Fusion in a Staged Z-Pinch," 2015, IEEE Transactions on Plasma Science, vol. 43, No. 8, pp. 2463-2468 (Year: 2015).*
Kaushik et al., "An Exploration of Pulsed Magnetic Field Driven Fusion in Z Pinch Configuration," 2001, IAEA, vol. 33, Issue 29 (Year: 2001).*

(Continued)

*Primary Examiner* — Jinney Kil
(74) *Attorney, Agent, or Firm* — Luedeka Neely, P.C.

(57) ABSTRACT

A diode assembly for producing a pulsed fusion event in a z-pinch driver. The diode assembly includes an inner core including a lithium compound formed of one or more lithium isotopes and one or more hydrogen isotopes. An electrically conducting outer sheath is disposed around the inner core. The electrically conducting outer sheath includes an electrical conductance that is at least three times greater than an electrical conductance of the lithium compound of the inner core.

23 Claims, 3 Drawing Sheets

(56) References Cited

OTHER PUBLICATIONS

Cassenti, "Hybrid Nuclear Pulse Propulsion," 1999, American Institute of Aeronautics & Astronautics, A99-2699 (Year: 1999).*
Science History Institute, "Science of Plastics," 2018, https://web.archive.org/web/20180321130328/https://www.sciencehistory.org/science-of-plastics (Year: 2018).*
Seifritz et. al., "Uranium and Thorium Shells Serving as Tampers of DT-Fusion Pellets for the Electron-Beam-Induced Fusion Approach," 1975, Transactions of the American Nuclear Society, vol. 21, pp. 18-19 (Year: 1975).*
Wessel, F. J., et al. "Fusion in a staged Z-pinch." AIP Conference Proceedings. vol. 1721. No. 1. AIP Publishing LLC, 2016. (Year: 2016).*
Adams, Robert B., et al., Pulsed Fission-Fusion (PuFF)—Phase I Report, 2014, 52 pages.
Bland, S.N., et al., Implosion and stagnation of wire array Z pinches, Physics of Plasmas, American Institute of Physics, 2007, vol. 14.
Cich, Michael J., et al., Microfabricated Wire Arrays for Z-Pinch, Sandia Report, Sandia National Laboratories, Oct. 2008, 38 pages.
Garner, Ray, Scientists developing pulsed nuclear fusion system for distant missions, Phys.org, Jun. 27, 2012.
Staff writers, Support fusion propulsion research, Space Daily, Jul. 31, 2013.
Unified Code for Nonequilibrium Plasma Systems, Department of Aerospace Engineering, University of Michigan, 2 pages.

* cited by examiner

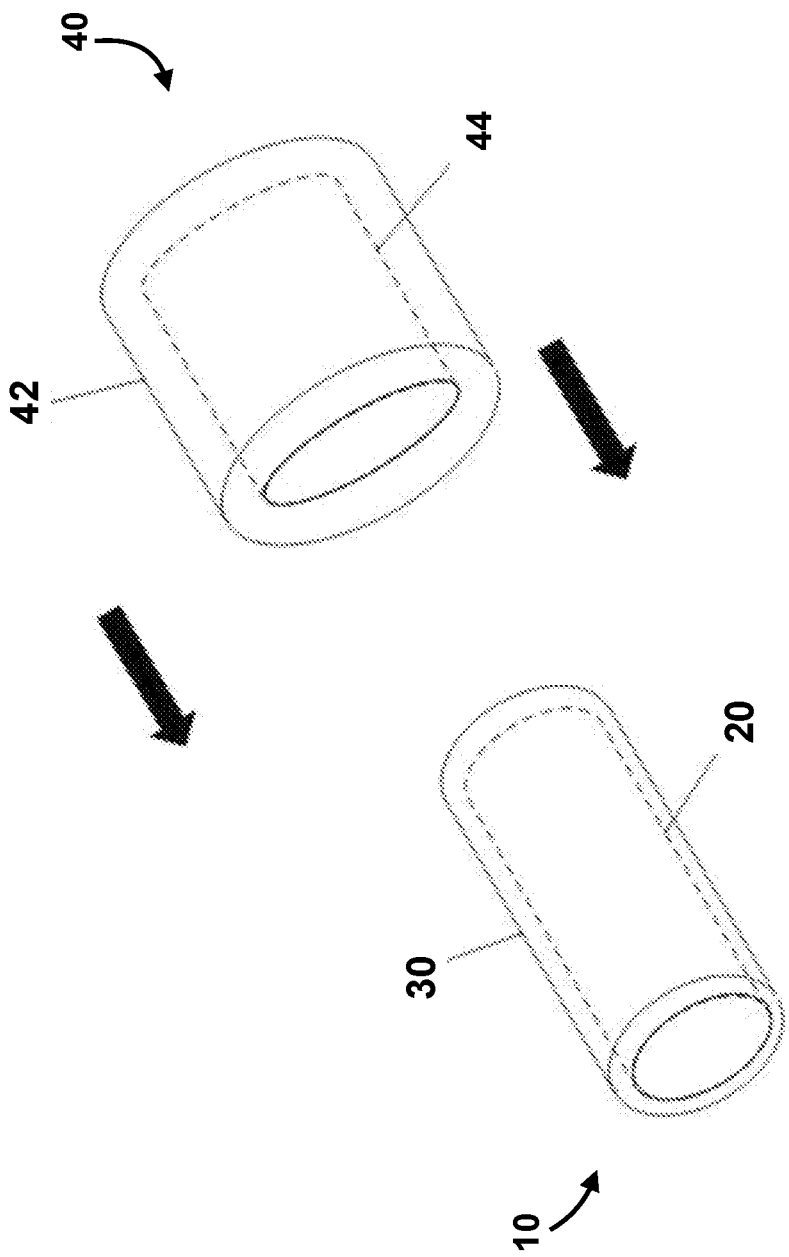

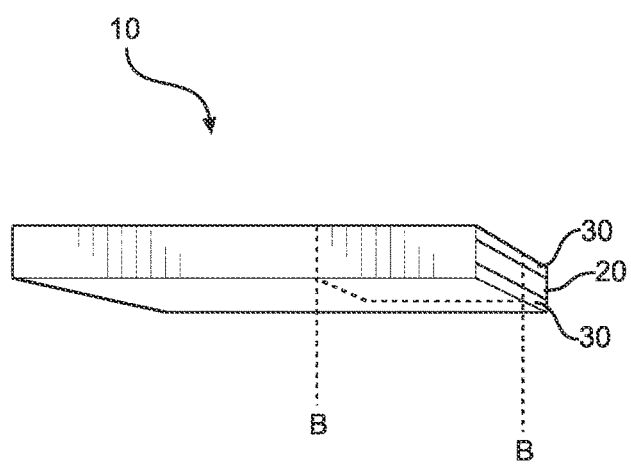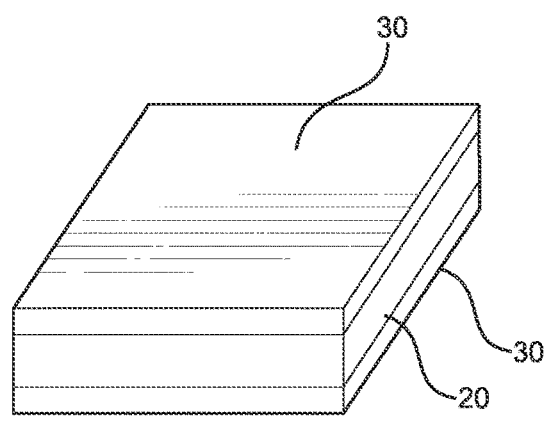
FIG. 3A　　　　FIG. 3B

DIODE ASSEMBLY FOR PULSED FUSION EVENTS

GOVERNMENT RIGHTS

The U.S. Government has rights to this invention pursuant to contract number DE-NA0001942 between the U.S. Department of Energy and Consolidated Nuclear Security, LLC.

FIELD

The disclosure relates to the field of pulsed fusion events. More particularly, this disclosure relates to a simplified diode assembly containing the fuel material for pulsed fusion events.

BACKGROUND

Nuclear fusion occurs when the atomic nuclei of two or more light atoms collide to make a heavier atom. Following the collision, the total mass of the new atom is less than that of the two atoms that formed it, and the "extra" mass is converted to energy according to the formula $E=mc^2$. In order for fusion to occur, high temperatures and high pressures are required. Under these conditions, atoms are highly excited and are stripped of all their electrons (i.e., ionized), which forms a plasma. The high temperature gives the atoms more kinetic energy, resulting in more collisions. The high pressure causes the atoms to be closer together, making their collision more likely.

Pulsed fusion events are a type of nuclear fusion produced by inertial confinement or compression of a fuel element to very high pressure and temperature conditions in a technique commonly termed "z-pinch." In typical z-pinch drivers, an axial current is applied across a diode assembly formed of a cylindrical array of small, electrically conducting wires disposed around a fuel element. The large voltage across the diode assembly produces very high temperature conditions that subsequently ionizes the material of the electrically conducting wires and produces the plasma. The cylindrical geometry of the wires in the diode assembly causes an inward compression of the wires with respect to the axis of the current, which confines the plasma around the fuel element. A magnetic field around the plasma further induces a high current through the plasma, which generates a Lorentz force on the fuel element to compress the fuel element to fusion conditions. As the plasma is highly conductive, the energy stored in the fuel element is quickly depleted as a result of the high current running through the plasma. Thus, the nuclear fusion that occurs in the z-pinch driver is often referred to as a "pulsed fusion event."

The wire array for producing pulsed fusion events in z-pinch drivers has several weaknesses. In particular, a large number of wires are required to be carefully constructed in the diode assembly to produce a symmetrical plasma. An asymmetrical plasma results in Taylor instabilities, which disrupts the compression symmetry on the fuel element and results in non-fusion conditions. Thus, the wire array is time-consuming and complex to assemble. The precision necessary to construct the wire array combined with its complexity severely limit the frequency of pulsed fusion events able to be produced by a z-pinch driver to one event over multiple days. As should be understood, limits on the number of pulsed fusion events that are possible severely impacts potential applications for z-pinch technology.

Further, because the wire array of the diode assembly must be carefully constructed and inserted into a z-pinch driver in order to produce pulsed fusion events, the materials of the wires are limited to those that can be drawn to fine wires yet strong enough to form the wire array. Typical materials used are tungsten and aluminum for the electrically conducting wires. Further applications for z-pinch machines would benefit from a wider selection of materials for the generated plasma.

Accordingly, what is needed is a fuel diode assembly for a z-pinch driver that is more efficient to construct and insert into a z-pinch machine for producing pulsed fusion events while decreasing the duration of time between pulsed fusion events produced by the z-pinch driver. It is also desired to provide a diode assembly that is efficiently made from electrically conducting materials disposed around the fuel element in addition to tungsten and aluminum.

SUMMARY

The present disclosure provides a diode assembly for producing a pulsed fusion event in a z-pinch driver. The diode assembly includes an inner core and an electrically conducting outer sheath. The inner core includes a lithium compound formed of one or more lithium isotopes and one or more hydrogen isotopes. The electrically conducting outer sheath is disposed around the inner core and in a symmetrical relationship with the inner core. The majority of the voltage induced current must flow though the electrically conductive outer sheath and, therefore, the electrical conductance of the sheath material is at least three times greater than an electrical conductance of the lithium compound of the inner core.

According to certain embodiments, the lithium compound of the inner core is selected from a group consisting of $^6$LiD, $^6$LiT, $^7$LiD, and $^7$LiT. In some embodiments, the inner core consists of only the lithium compound.

According to certain embodiments, the electrically conducting outer sheath is selected from a group consisting of copper, aluminum, silver, lithium, tungsten, gold, zinc, calcium, and alloys thereof. In more preferred embodiments, the electrically conducting outer sheath is selected from a group consisting of silver, copper, and alloys thereof. In some embodiments, the electrically conducting outer sheath includes an electrical conductance that is at least ten times greater than the electrical conductance of the lithium compound of the inner core.

According to certain embodiments, the inner core and electrically conducting outer sheath includes a symmetrical relationship with respect to each other. In some embodiments, the symmetrical relationship includes the inner core and electrically conducting outer sheath each being cylindrical such that the diode assembly is cylindrical. In other embodiments, the symmetrical relationship includes the inner core and electrically conducting outer sheath each being a one-dimensional plate such that the diode assembly includes a layered plate arrangement.

According to certain embodiments, the diode assembly further includes a tamper disposed around the electrically conducting outer sheath. In certain embodiments, the tamper includes a non-conducting polymer layer disposed around the electrically conducting outer sheath and a tamper layer disposed around the non-conducting polymer layer. In some embodiments, the tamper layer is selected from a group consisting of uranium, platinum, tungsten, niobium, molybdenum, osmium, rhenium, and combinations thereof.

According to certain embodiments, the diode assembly further includes a tamper layer disposed around the electrically conducting outer sheath where the tamper layer includes an electrical conductance less than the electrical conductance of the electrically conducting outer sheath. In certain embodiments, the tamper layer is selected from a group consisting of uranium, platinum, tungsten, niobium, molybdenum, osmium, rhenium, and combinations thereof. In some embodiments, the tamper layer includes $^{238}$U.

According to another embodiment of the disclosure, a diode assembly is provided for producing a pulsed fusion event in a z-pinch driver that includes an inner core and an electrically conducting outer sheath. The inner core includes a lithium compound formed of one or more lithium isotopes and one or more hydrogen isotopes with the lithium compound being selected from a group consisting of $^{6}$LiD, $^{6}$LiT, $^{7}$LiD, and $^{7}$LiT. The electrically conducting outer sheath is disposed around the inner core and in a symmetrical relationship with the inner core. The electrically conducting outer sheath includes an electrical conductance that is at least three times greater than an electrical conductance of the lithium compound of the inner core.

According to certain embodiments, the inner core consists of only the lithium compound.

According to certain embodiments, the electrically conducting outer sheath includes an electrical conductance that is at least ten times greater than an electrical conductance of the lithium compound of the inner core and the electrically conducting outer sheath is selected from a group consisting of copper, aluminum, silver, gold, and alloys thereof.

According to certain embodiments, the diode assembly further includes a tamper disposed around the electrically conducting outer sheath where the tamper includes a non-conducting polymer layer disposed around the electrically conducting outer sheath and a tamper layer disposed around the non-conducting polymer layer. In certain embodiments, the tamper layer is selected from a group consisting of uranium, platinum, tungsten, niobium, molybdenum, osmium, rhenium, and combinations thereof.

According to certain embodiments, the diode assembly further includes a tamper layer disposed around the electrically conducting outer sheath where the tamper layer includes an electrical conductance that is less than the electrical conductance of the electrically conducting outer sheath. According to certain embodiments, the tamper layer is selected from a group consisting of uranium, platinum, tungsten, niobium, molybdenum, osmium, rhenium, and combinations thereof. In certain embodiments, the tamper layer includes $^{238}$U.

According to yet another embodiment of the disclosure, a diode assembly is provided for producing a pulsed fusion event in a z-pinch driver. The diode assembly includes an inner core, an electrically conducting outer sheath, and a tamper. The inner core includes a lithium compound formed of one or more lithium isotopes and one or more hydrogen isotopes where the lithium compound is selected from a group consisting of $^{6}$LiD, $^{6}$LiT, $^{7}$LiD, and $^{7}$LiT. The electrically conducting outer sheath is disposed around the inner core and in a symmetrical relationship with the inner core. The electrically conducting outer sheath has an electrical conductance that is at least ten times greater than an electrical conductance of the lithium compound of the inner core. The tamper is disposed around the electrically conducting outer sheath and includes a non-conducting polymer layer disposed around the electrically conducting outer sheath and a tamper layer disposed around the non-conducting polymer layer. The tamper layer includes an electrical conductance that is less than the electrical conductance of the electrically conducting outer sheath.

According to certain embodiments, the inner core consists of only the lithium compound.

According to certain embodiments, the electrically conducting outer sheath is selected from a group consisting of copper, aluminum, silver, gold, and alloys thereof.

According to certain embodiments, the tamper layer is selected from a group consisting of uranium, platinum, tungsten, niobium, molybdenum, osmium, rhenium, and combinations thereof.

According to certain embodiments, the tamper layer includes $^{238}$U.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 2 is a diode assembly with a tamper according to one embodiment of the disclosure;

FIG. 3A depicts a diode assembly having a layered plate arrangement according to another embodiment of the disclosure; and FIG. 3B depicts a cut-out B-B portion of the diode assembly of FIG. 3A that has been rotated for clarity.

DETAILED DESCRIPTION

Figure 1:
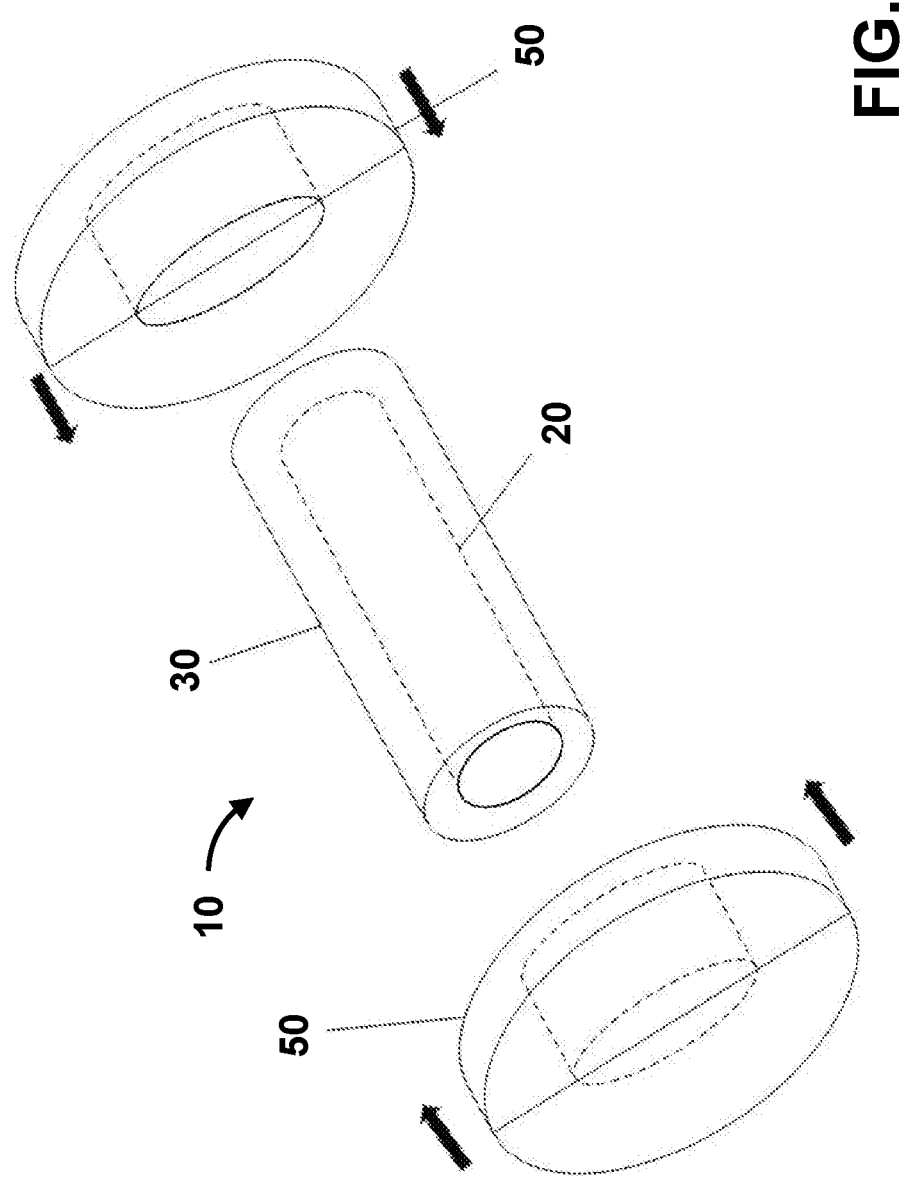
FIG. 1 is a diode assembly for insertion between electrical clamping devices according to one embodiment of the disclosure.

In the following detailed description of the preferred and other embodiments, reference is made to the accompanying drawings, which form a part hereof, and within which are shown by way of illustration the practice of a specific embodiment of a diode assembly for a z-pinch driver. It is to be understood that other embodiments may be utilized, and that structural changes may be made and processes may vary in other embodiments.

Referring to FIG. 1, a diode assembly 10 for a z-pinch driver is depicted according to an exemplary embodiment of the disclosure. The diode assembly 10 includes an inner core 20 formed of a fusionable fuel material and an electrically conducting outer sheath 30 disposed around the inner core 20. According to certain embodiments, the diode assembly 10 is electrically connected to an existing z-pinch driver using any number of electrical connections as known in the art. For example, FIG. 1 depicts electrical clamping devices 50 that would typically be components of the z-pinch driver itself. A diode assembly 10 would be inserted between the clamping devices 50 for electrically connecting the diode assembly 10 to the z-pinch driver. According to certain embodiments, the z-pinch driver may also include a magazine type feeding device (not depicted) disposed between the electrical clamping devices 50 for fast and repetitive loading of diode assemblies 10 to the z-pinch driver.

In operation, electrical current is generated by the z-pinch driver and passed through the clamping devices 50 at an extremely high voltage to cause the metal of the electrically conducting outer sheath 30 to generate a plasma. A magnetic field (also supplied by the z-pinch driver) then induces a current in the plasma, which compresses the plasma of the electrically conducting outer sheath 30 around the inner core 20 of fusionable fuel material. Compression of the plasma around the inner core 20 in-turn compresses the inner core 20 to temperatures and pressures sufficient to produce a fusion event for generating energy. As the present diode assembly is preferably intended for generating pulsed fusion events in a z-pinch driver (i.e., where pure fusion plasma is compressed as compared to compressing a fission-fusion plasma), the inner core 20 will preferably exclude any type of fissionable material such as $^{235}U$, $^{238}U$, or $^{239}Pu$. In this regard, while a fission/fusion reaction is easier to start, the fission materials are less energetic and produce highly radioactive byproducts that make it hazardous working around the diode assembly both before and after the nuclear event.

In preferred embodiments, the electrically conducting outer sheath 30 and the inner core 20 are closely coupled to eliminate or otherwise significantly reduce the potential losses due to compression instabilities and other factors. In addition, the electrically conducting outer sheath 30 is preferably arranged in a symmetrical geometry around the inner core 20. For example, according to certain embodiments, the electrically conducting outer sheath 30 is cylindrical and compressed around a corresponding cylindrical inner core 20 to form the symmetrical geometry as depicted in FIG. 1. According to other embodiments, the outer sheath 30 is in the form of one-dimensional plates compressed against a corresponding inner core 20 plate to form a symmetrical geometry having a layered plate arrangement as depicted in FIGS. 3A and 3B. It should be understood that other symmetrical relationships such as spheres are believed possible and within the scope of the present disclosure. As a result of the symmetrical relationship between the outer sheath 30 and the inner core 20, the resulting plasma implosion will be symmetrical and the resulting Lorentz force will compress the inner core 20 to fusion pressures and temperatures while minimizing Taylor instability issues.

As noted above, fusion of atoms after being stripped of electrons occurs at high temperatures and high pressures. As the atoms no longer have electrons, the atoms carry a positive charge. The higher the mass of the atom (i.e., the higher number of protons of the atom), the greater the positive charge for that atom and the higher pressure/temperature required to force the atoms to fuse together. Thus, low mass atoms (e.g., hydrogen isotopes) are the optimum fuel options for the inner core 20 due to the lower temperature and pressure conditions necessary for fusion conditions by the z-pinch driver using diode assembly 10. For example, hydrogen isotopes require temperatures around 10,000,000° K and pressure densities around 100 g/cc to achieve fusion conditions. On the other hand, helium isotopes (which contain only one additional proton) require temperatures around 100,000,000° K and pressure densities around 100,000 g/cc to achieve fusion conditions. Accordingly, while various materials of the inner core 20 may theoretically be used for diode assembly 10, the inner core 20 is preferably formed of materials that contain hydrogen isotopes and compounds that form hydrogen isotopes upon neutron decay.

Under fusion conditions, the hydrogen isotopes of deuterium and tritium release energy according to the following equations (where D is the hydrogen isotope of deuterium; T is the hydrogen isotope of tritium; He is the helium 4 isotope; N is a neutron; and P is a proton):

$$^2_1D + {}^3_1T \rightarrow {}^4_2He\ (3.5\ MeV) + N^0\ (14.1\ MeV) \quad \text{Eq. 1}$$

$$^2_1D + {}^2_1D \rightarrow {}^3_1T\ (1.01\ MeV) + P^+(3.02\ MeV) \quad \text{Eq. 2a (50\% probability)}$$

$$^2_1D + {}^2_1D \rightarrow {}^3_2He\ (0.82\ MeV) + N^0\ (2.45\ MeV) \quad \text{Eq. 2b (50\% probability)}$$

$$^3_1T + {}^3_1T \rightarrow {}^4_2He + 2N^0 + 11.3\ MeV \quad \text{Eq. 3}$$

In more preferred embodiments, the inner core 20 is formed of a lithium compound having at least one or more lithium isotopes and one or more hydrogen isotopes such as $^6LiD$, $^6LiT$, $^7LiD$, and $^7LiT$. Each of these compounds provide the deuterium and tritium needed to produce the reactions in the equations above when subjected to fusion conditions. Further, both lithium-6 and lithium-7 decay by the neutron flux generated through the reactions in above Eqs. 1, 2a, and 3 to increase the tritium population and provide additional tritium fusion fuel through the below equations:

$$^6_3Li + N^0 \rightarrow {}^4_2He + {}^3_1T + 4.78\ MeV \quad \text{Eq. 4}$$

$$^7_3Li + N^0 + 2.47\ MeV \rightarrow {}^4_2He + {}^3_1T + N^0 \quad \text{Eq. 5}$$

In most preferred embodiments, the lithium compound of the inner core 20 is $^6LiD$ (i.e., lithium-6 deuteride). $^6LiD$ is the optimal fuel source because it has the high neutron capture cross section at low energy levels (940 barns for low energy thermal neutron <5 MeV needed to start the chain reaction). Using $^6LiD$ as an example, fusion of the $^6LiD$ in the inner core produces tritium and generates 4.78 MeV of energy according to the reaction in Eq. 6 below.

$$^6_3Li + N^0 \rightarrow {}^4_2He + {}^3_1H + 4.78\ MeV \quad \text{Eq. 6}$$

The energy produced is then divided between the helium and tritium in inverse proportion to their masses, which gives the tritium a higher energy level. Fusion of the resulting tritium and deuterium produces helium and an energetic neutron according to the reaction in Eq. 7 below (the energy is divided between the helium and neutron in inverse proportion to their masses, which gives the neutron most of the energy).

$$^3_1H + {}^2_1H \rightarrow {}^4_2He + N + 17.588\ MeV \quad \text{Eq. 7}$$

The energetic neutron produced by Eq. 7 continues the chain reaction by serving as the initiating neutron in Eq. 6. The helium energy totaled from both equations can be thermalized to produce useful energy.

Another advantage of using a lithium compound having at least one or more lithium isotopes and one or more hydrogen isotopes for the inner core is that it provides a higher molecular density of the hydrogen isotopes than the solid phase of the isotope by itself. For example, LiD has a theoretical density of 0.789 to 0.791 g/cm³ depending on temperature and pressure with about ¼ of that density (i.e., 0.198 g/cm³) provided by the deuterium atom. On the other hand, the density of solid phase deuterium (such as produced cryogenically) is typically at about 0.118 g/cm³. Accordingly, utilizing LiD (e.g., $^6LiD$ or $^7LiD$) as the inner core 20 provides an inner core with a significantly higher hydrogen isotope density (i.e., about 60% higher) than the solid phase of the deuterium isotope. The higher molecular density of the compound of the inner core 20 provides more atoms per unit volume, thereby making fusion collisions more likely to occur. Accordingly, the density of the inner core 20 is preferably at, or as close as possible (>99%) to, the theoretical density of the lithium compound selected for the inner core 20.

With continued reference to FIG. 1, the material for the electrically conducting outer sheath 30 is selected at least in large part based on the electrical conductance of the particular metal or metal alloy selected. In this regard, the diode assembly 10 requires that the electrical current supplied by the z-pinch driver flow through the metal outer sheath 30 in order to ionize the outer sheath 30 rather than the inner core 20. As such, according to certain embodiments, it is desirable for the electrical conductance of the outer sheath 30 to be substantially higher than the electrical conductance of the inner core 20. A non-limiting list of potential candidate materials for the electrically conducting outer sheath 30 is provided in Table 1 below. Table 1 displays the electrical conductance of the candidate materials at room temperature, which is typically the temperature of the materials when the initial electrical current is passed along the outer sheath 30. Table 1 further compares the electrical conductance of the candidate materials to LiH (it is noted that natural lithium hydride has been selected as a reference due to $^6$LiD, $^6$LiT, $^7$LiD, and $^7$LiT not having any known industry standard conductance values).

TABLE 1

Electrical Conductance of Outer Sheath Candidate Materials

| Material | Conductance (S/m × $10^{-6}$) | Ratio of Conductance referenced to $^6$LiD |
|---|---|---|
| Silver | 63 | 17.2 |
| Copper | 59 | 16.4 |
| Gold | 41 | 11.4 |
| Aluminum | 38 | 10.5 |
| Calcium | 29.8 | 8.3 |
| Tungsten | 17.9 | 5.0 |
| Zinc | 16.9 | 4.7 |
| Lithium Metal | 11 | 3.0 |
| Iron | 10.0 | 2.8 |
| Tin | 9.2 | 2.6 |
| Lead | 4.6 | 1.3 |
| Titanium | 2.4 | 0.7 |
| Mercury | 1.0 | 0.3 |
| LiH | 3.6 | — |

Using the ratio of metal conductance to that of the $^6$LiD inner core 20, silver and copper are the preferred materials at least from an electrical standpoint as silver and copper have an electrical conductance that is at least about sixteen times greater than the electrical conductance of LiH. However, other factors in combination with electrical conductance may ultimately determine the optimum material for the electrically conducting outer sheath 30. Such other factors may be cost, plasma density created, ease of manufacturing, chemical stability upon atmospheric products, ability to produce more fusion fuel in situ, ability to increase the neutron population, and/or ability to closely couple with the inner core 20.

According to certain embodiments, the outer sheath 30 is dimensioned and configured to include an outer layer mass that symmetrically approximates the mass of the inner core 20. For purposes of the present disclosure, "symmetrically approximate" refers to the outer sheath 30 including a mass that is within about ±50% of the mass of the inner core 20 at any given point along the length of the diode assembly 10. In a most preferred embodiment, the outer sheath 30 includes a mass that is within about ±25% of the mass of the inner core 20 at any given point along the length of the diode assembly 10. In this regard, the outer sheath 30 should include a mass sufficient to allow the high electric current to pass through the plasma and generate the Lorentz force on the inner core 20.

According to certain embodiments, the diode assembly 10 may further include a tamper 40 formed around the electrically conducting metal sheath 30. Referring now to FIG. 2, which depicts an exploded view of tamper 40 with respect to diode assembly 10, the tamper 40 is preferably in the form of a second sheath that is closely coupled to the electrically conducting sheath 30. The tamper sheath 40 preferably includes a tamper layer 42 and a non-conductive polymer layer 44. The non-conductive polymer layer 44 (e.g., polyvinyl chloride) is intended to be disposed between the tamper layer 42 and the outer metal sheath 30 of the diode 10 to electrically isolate the tamper 40 from the metal sheath 30 (particularly when the material of the tamper layer 42 has a relatively high electrical conductance as shown in Table 2 below). The length of the tamper 40 is typically shorter than the length of the inner core 20 and corresponding sheath 30 as depicted in FIG. 2 such that the ends of the diode remain exposed to allow for the electrical connections 50 of FIG. 1. The tamper 40, and particularly the tamper layer 42 of tamper 40, serves two primary purposes: (1) to aid in the inertial confinement of the metal plasma, which results in higher compressive forces on the inner core 20, and which subsequently results in more efficient and optimized fusion conditions; and (2) to aid in the neutronics of the fusion event (i.e., tamper 40 serves to reflect neutrons back towards the diode assembly 10 during fusion conditions).

Preferred materials of tamper layer 42 have a combined high density, high melting point, low electrical conductivity, and low cost. The high density provides the inertial confinement of the metal plasma by reflecting energetic neutrons back towards the fusion region. The high melting temperature assures that the tamper layer 42 stays assembled as long as possible. The low electrical conductivity ensures that most of the electrical current passes through the electrically conducting metal sheath 30 to produce a plasma that is as hot as possible. A non-limiting list of potential candidate materials for the tamper layer 42 is provided in Table 2 below:

TABLE 2

Tamper Layer Candidate Materials

| Material | Density (g/cm$^3$) | Melting Point (° C.) | Conductance (S/m × $10^{-6}$) | ~Cost ($/lb) | (Density × MP)/ (Conductance × $) |
|---|---|---|---|---|---|
| Beryllium | 1.85 | 1287 | 25 | 3,400 | 0.03 |
| Platinum | 21.45 | 1768 | 9.4 | 13,408 | 0.3 |
| Osmium | 22.3 | 3045 | 12 | 13,490 | 0.4 |
| Rhenium | 21 | 3186 | 5.6 | 1,290 | 9.3 |
| Tungsten | 19.25 | 3422 | 27 | 20 | 122 |
| Niobium | 8.57 | 2468 | 6.7 | 19 | 166.1 |
| Molybdenum | 10.22 | 2617 | 20 | 7 | 191 |
| Uranium | 19.05 | 1135 | 3.1 | 24 | 290.6 |

As indicated above, using the final column of Table 2, uranium will often be the preferred material of the tamper layer 42 given that it has a low conductance, high density, and low cost. Further, uranium has the additional benefit of being able to contribute to the neutron population of the diode assembly 10 since its fissile product produces an abundant neutron flux. Other materials such as beryllium may also be selected based on their ability to contribute to the neutron population. It should be understood that other factors may dictate other materials for the tamper layer 42. In particular, if the assembly time of the diode 10 is an issue, tungsten, niobium, or molybdenum would likely be the preferred materials due to the corrosive nature of uranium in the presence of atmospheric products.

According to another aspect of the disclosure, the overall mass and resulting dimensions of the diode assembly 10 composite will be a function of the desired energy output of a discrete pulsed fusion event. In this regard, as two atoms are joined under fusion conditions, energy is released according to Eqs. 1-3 above. The total energy release from a single pulsed fusion event is the summation of all the individual fusion reactions that take place during that pulse. The starting mass of the diode assembly 10 based upon its diameter, length, and density establishes the maximum number of fusion reactions that can occur from a single pulse. The total number of individual fusion reactions that actually occur is a function of the z-pinch compression pressure, temperature, and the amount of time the z-pinch compression stays assembled before energy released reverses the compression and causes rapid expansion of the remaining diode assembly 10 mass. The tamper 40 works to focus the plasma layer created by the cylindrical conducting outer sheath 30 inward, further compressing the inner core 20 of fusionable fuel material, which produces higher compression pressure and temperature while holding the z-pinch compression assembled for a longer period of time.

As a result of the teachings described herein, particularly a diode assembly 10 that is formed of an inner core 20 and an electrically conducting outer sheath 30 disposed around the inner core such that a plurality of diode assemblies may be quickly and repetitively inserted into a z-pinch driver, it is believed that use of diode assemblies 10 of the present disclosure may be optimized to include a fusion frequency potential of multiple pulsed fusion events per day.

Alternate embodiments of diode assembly 10 may include advanced methods for liquid injection of molten fusionable fuel into a plasma field compressed by a Lorentz force of the outer sheath 30. However, in such an approach, developing a symmetrical configuration necessary to eliminate the Taylor instabilities would likely be difficult to control.

It should be understood that a diode assembly 10 according to the present disclosure may be fabricated in any number of different manners. In certain embodiments, and particularly when the outer sheath 30 includes highly conductive and/or non-lithium materials as identified in Table 1, conventional deposition methods such as vapor deposition, liquid plating, standard machining, etc. are utilized to form the electrically conducting outer sheath 30 around the inner core 20. Similarly, when the diode assembly 10 includes a tamper 40, conventional deposition methods may be used to form the tamper layer 42 and around the electrically conducting outer sheath 30. If utilized, the non-conductive polymer layer 44 may also be applied to the electrically conducting outer sheath according to a variety of conventional methods such as heat curing.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A diode assembly for producing a pulsed fusion event in a z-pinch driver, the diode assembly comprising:
    an inner core including a lithium compound formed of one or more lithium isotopes and one or more hydrogen isotopes; and
    an electrically conducting outer sheath compressed against the inner core and in a symmetrical relationship with the inner core, the electrically conducting outer sheath having an electrical conductance that is at least three times greater than an electrical conductance of the lithium compound of the inner core, and the electrically conducting outer sheath being selected from a group consisting of copper, aluminum, silver, tungsten, gold, zinc, calcium, and alloys thereof,
    wherein, when electrical current is supplied by the z-pinch driver, the electrically conducting outer sheath is dimensioned and configured to generate a plasma around the inner core, and, when a magnetic field is supplied by the z-pinch driver, the plasma is compressed against the inner core to produce the pulsed fusion event.

2. The diode assembly of claim 1 wherein the lithium compound of the inner core is selected from a group consisting of $^6$LiD, $^6$LiT, $^7$LiD, and $^7$LiT.

3. The diode assembly of claim 2 wherein the inner core consists of the lithium compound.

4. The diode assembly of claim 1 wherein the electrically conducting outer sheath is selected from a group consisting of silver, copper, and alloys thereof.

5. The diode assembly of claim 1 wherein the electrical conductance of the electrically conducting outer sheath is at least ten times greater than the electrical conductance of the lithium compound of the inner core.

6. The diode assembly of claim 1 wherein the symmetrical relationship is selected from the group consisting of: the inner core and electrically conducting outer sheath each being cylindrical such that the diode assembly is cylindrical, and the inner core and electrically conducting outer sheath each being a one-dimensional plate such that the diode assembly includes a layered plate arrangement.

7. The diode assembly of claim 1 further comprising a non-conducting polymer layer and a tamper layer, the non-conducting polymer layer disposed between the electrically conducting outer sheath and the tamper layer to electrically isolate the tamper layer from electrically conducting material of the diode assembly.

8. The diode assembly of claim 7 wherein the tamper layer is selected from a group consisting of uranium, platinum, tungsten, niobium, molybdenum, osmium, rhenium, and combinations thereof.

9. The diode assembly of claim 1 further comprising a tamper layer disposed around the electrically conducting outer sheath, the tamper layer including an electrical conductance less than the electrical conductance of the electrically conducting outer sheath.

10. The diode assembly of claim 9 wherein the tamper layer is selected from a group consisting of uranium, platinum, tungsten, niobium, molybdenum, osmium, rhenium, and combinations thereof.

11. The diode assembly of claim 9 wherein the tamper layer includes $^{238}$U.

12. A diode assembly for producing a pulsed fusion event in a z-pinch driver, the diode assembly comprising:
    an inner core including a lithium compound formed of one or more lithium isotopes and one or more hydrogen isotopes, the lithium compound being selected from a group consisting of $^6$LiD, $^6$LiT, $^7$LiD, and $^7$LiT; and
    an electrically conducting outer sheath compressed against the inner core and in a symmetrical relationship with the inner core, the electrically conducting outer sheath having an electrical conductance that is at least three times greater than an electrical conductance of the lithium compound of the inner core, and the electrically conducting outer sheath is selected from a group consisting of copper, aluminum, silver, gold, and alloys thereof, wherein, when electrical current is supplied by the z-pinch driver, the electrically conducting outer sheath is dimensioned and configured to generate a plasma around the inner core, and, when a magnetic field is supplied by the z-pinch driver, the plasma is compressed against the inner core to produce the pulsed fusion event.

13. The diode assembly of claim 12 wherein the inner core consists of the lithium compound.

14. The diode assembly of claim 12 further comprising a non-conducting polymer layer and a tamper layer, the non-conducting polymer layer disposed between the electrically conducting outer sheath and the tamper layer to electrically isolate the tamper layer from electrically conducting material of the diode assembly.

15. The diode assembly of claim 14 wherein the tamper layer is selected from a group consisting of uranium, platinum, tungsten, niobium, molybdenum, osmium, rhenium, and combinations thereof.

16. The diode assembly of claim 12 further comprising a tamper layer disposed around the electrically conducting outer sheath, the tamper layer including an electrical conductance less than the electrical conductance of the electrically conducting outer sheath.

17. The diode assembly of claim 16 wherein the tamper layer is selected from a group consisting of uranium, platinum, tungsten, niobium, molybdenum, osmium, rhenium, and combinations thereof.

18. The diode assembly of claim 16 wherein the tamper layer includes $^{238}U$.

19. A diode assembly for producing a pulsed fusion event in a z-pinch driver, the diode assembly comprising:

an inner core including a lithium compound formed of one or more lithium isotopes and one or more hydrogen isotopes, the lithium compound being selected from a group consisting of $^6LiD$, $^6LiT$, $7LiD$, and $^7LiT$;

an electrically conducting outer sheath compressed against the inner core and in a symmetrical relationship with the inner core, the electrically conducting outer sheath having an electrical conductance that is at least ten times greater than an electrical conductance of the lithium compound of the inner core;

a non-conducting polymer layer disposed around the electrically conducting outer sheath; and a tamper layer disposed around the non-conducting polymer layer such that the tamper layer is electrically isolated from the electrically conducting outer sheath, the tamper layer including an electrical conductance less than the electrical conductance of the outer sheath, wherein, when electrical current is supplied by the z-pinch driver, the electrically conducting outer sheath is dimensioned and configured to generate a plasma around the inner core, and, when a magnetic field is supplied by the z-pinch driver, the plasma is compressed against the inner core to produce the pulsed fusion event.

20. The diode assembly of claim 19 wherein the inner core consists of the lithium compound.

21. The diode assembly of claim 19 wherein the electrically conducting outer sheath is selected from a group consisting of copper, aluminum, silver, gold, and alloys thereof.

22. The diode assembly of claim 19 wherein the tamper layer is selected from a group consisting of uranium, platinum, tungsten, niobium, molybdenum, osmium, rhenium, and combinations thereof.

23. The diode assembly of claim 19 wherein the tamper layer includes $^{238}U$.

* * * * *